Figure 6:
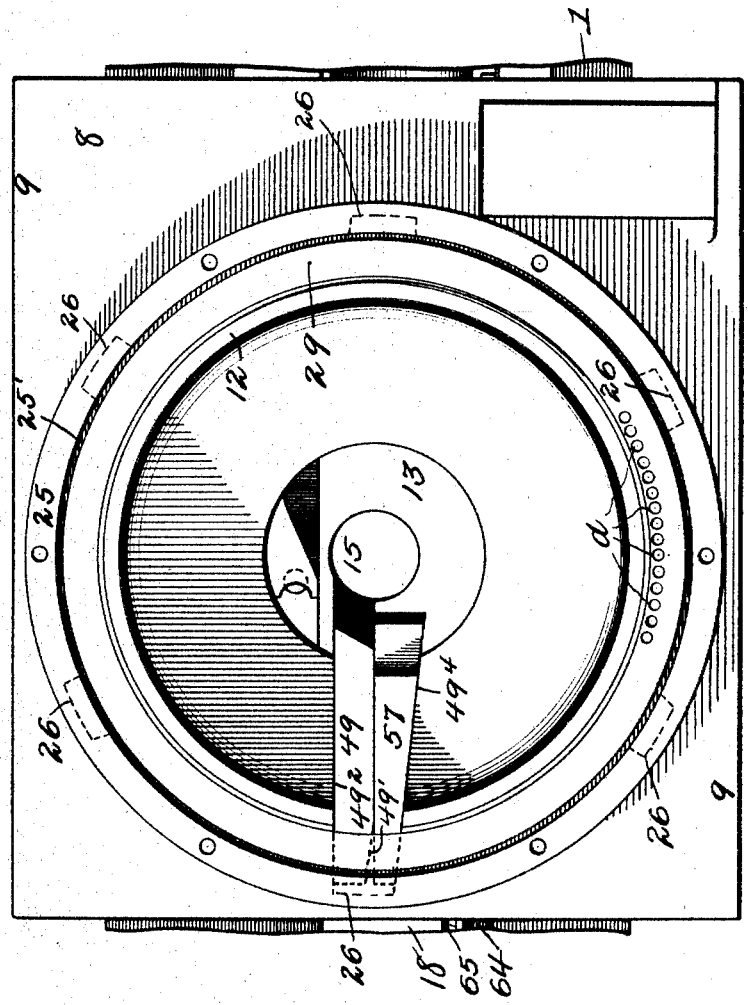

No. 766,828. PATENTED AUG. 9, 1904.
M. C. JOHNSON.
METAL WORKING MACHINE.
APPLICATION FILED MAR. 7, 1903.
NO MODEL. 12 SHEETS—SHEET 1.
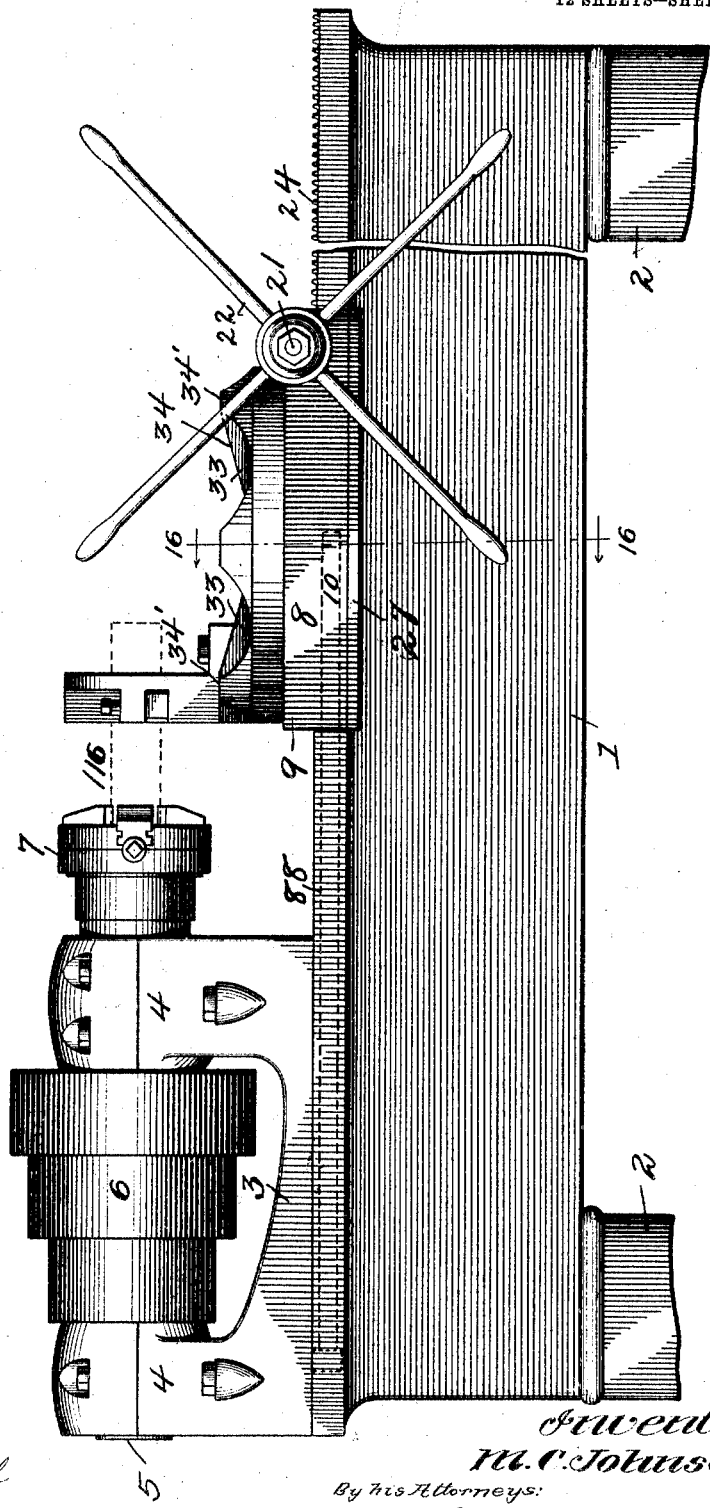
Witnesses:
F. G. Campbell
Wm. P. Laraway
Inventor:
M. C. Johnson.
By his Attorneys:
Blodgett & Peck

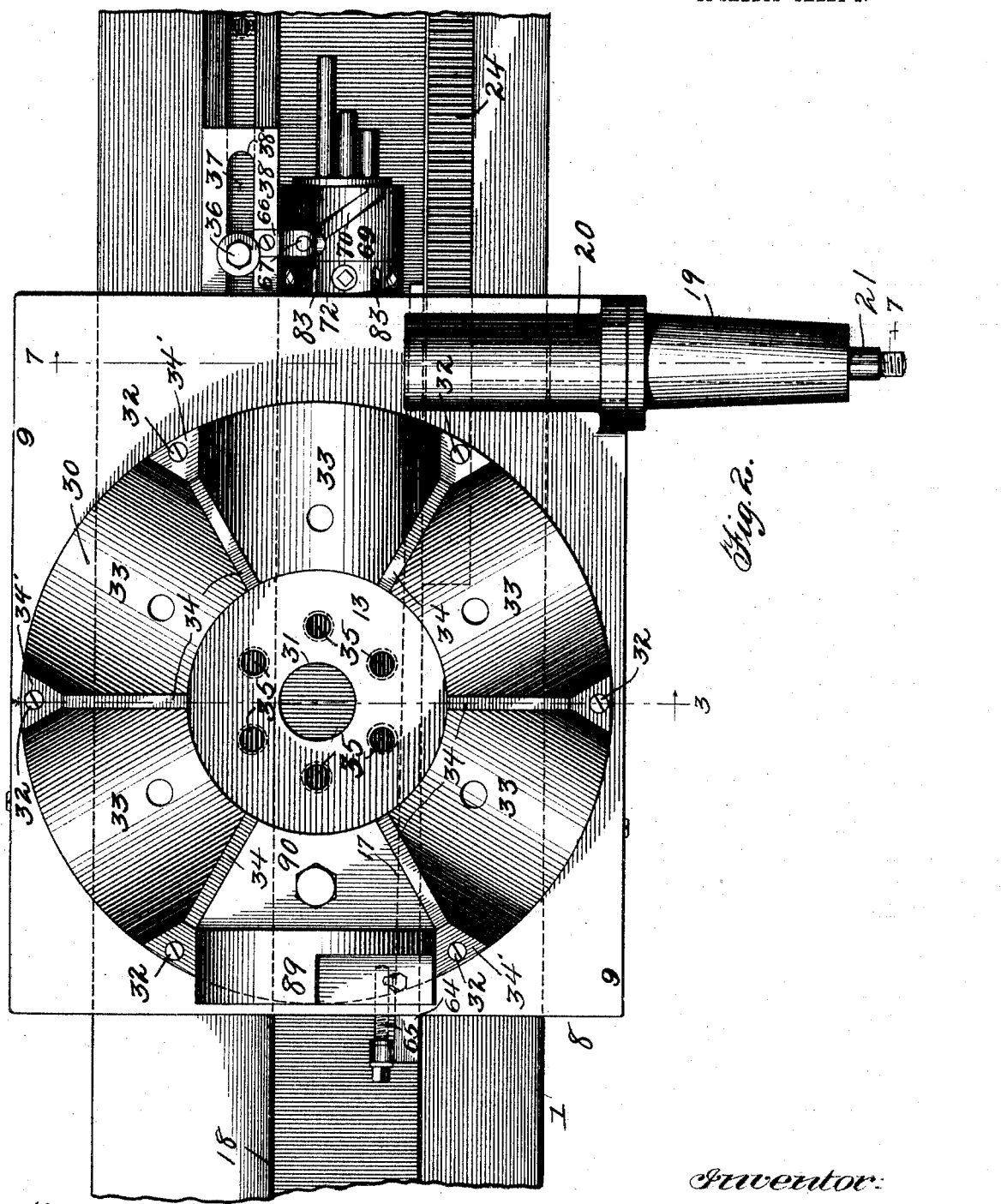

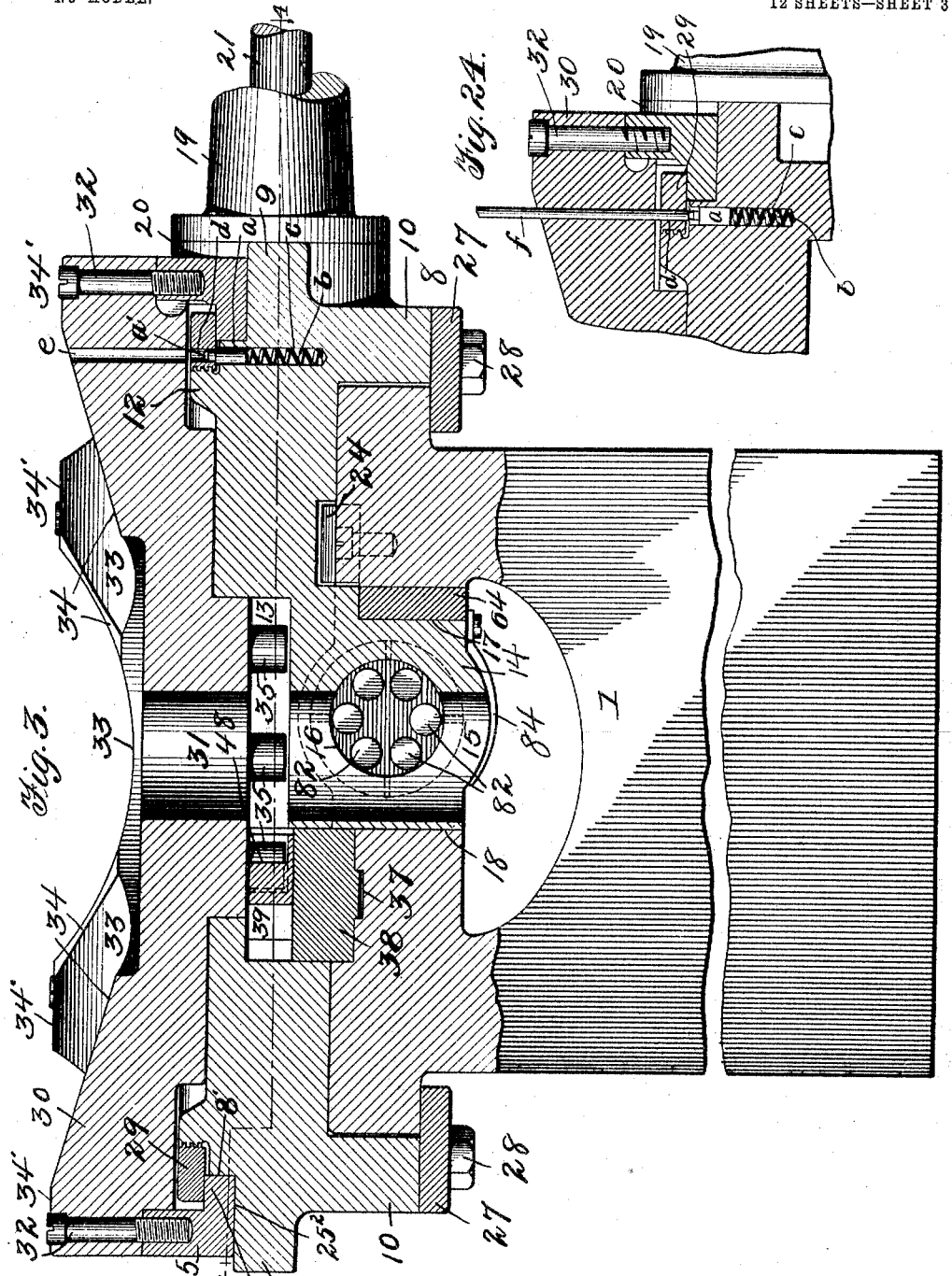

No. 766,828. PATENTED AUG. 9, 1904.
M. C. JOHNSON.
METAL WORKING MACHINE.
APPLICATION FILED MAR. 7, 1903.
NO MODEL. 12 SHEETS—SHEET 4.
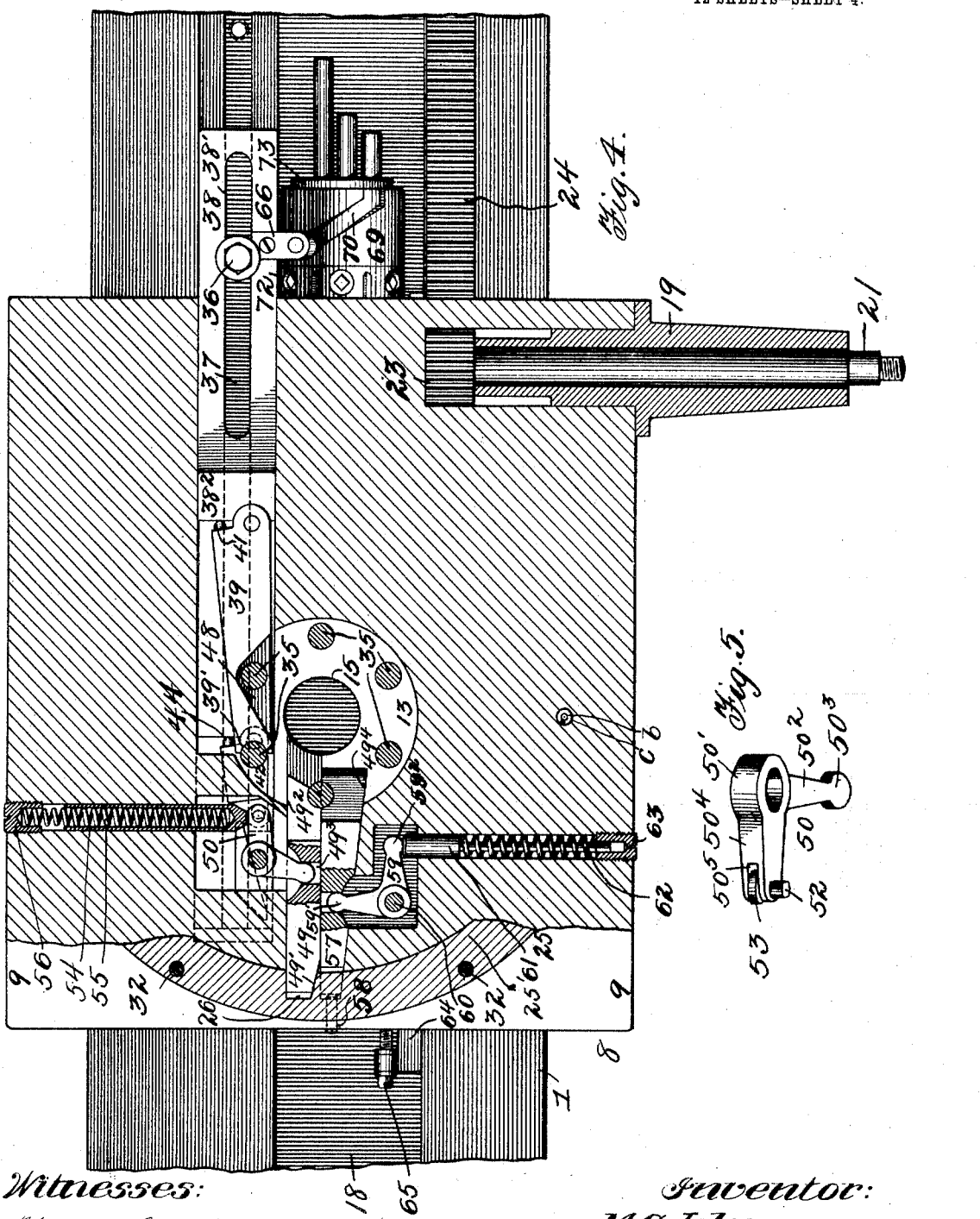
Witnesses:
Frank G. Campbell.
W<sup>m</sup> P. Laraway
Inventor:
M. C. Johnson.
By his Attorneys:
Blodgett & Peck No. 766,828. PATENTED AUG. 9, 1904.
M. C. JOHNSON.
METAL WORKING MACHINE.
APPLICATION FILED MAR. 7, 1903.
NO MODEL. 12 SHEETS—SHEET 5.

Witnesses:
F. G. Campbell.
W^m P. Laraway

Inventor:
M. C. Johnson.
By his Attorneys:
Blodgett & Peck

No. 766,828. PATENTED AUG. 9, 1904.
M. C. JOHNSON.
METAL WORKING MACHINE.
APPLICATION FILED MAR. 7, 1903.
NO MODEL. 12 SHEETS—SHEET 6.
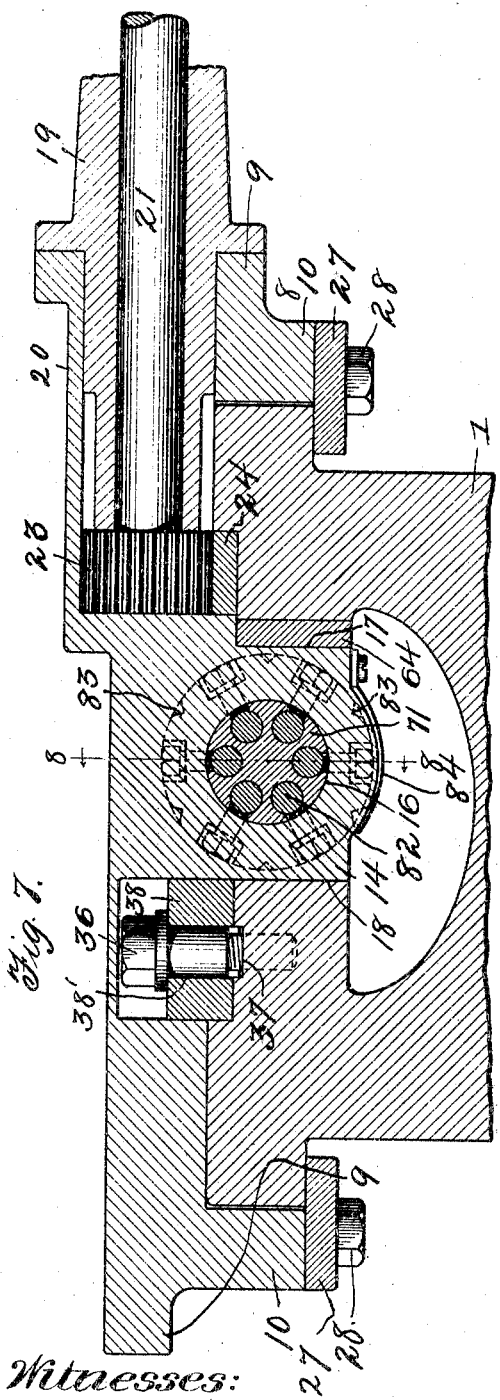
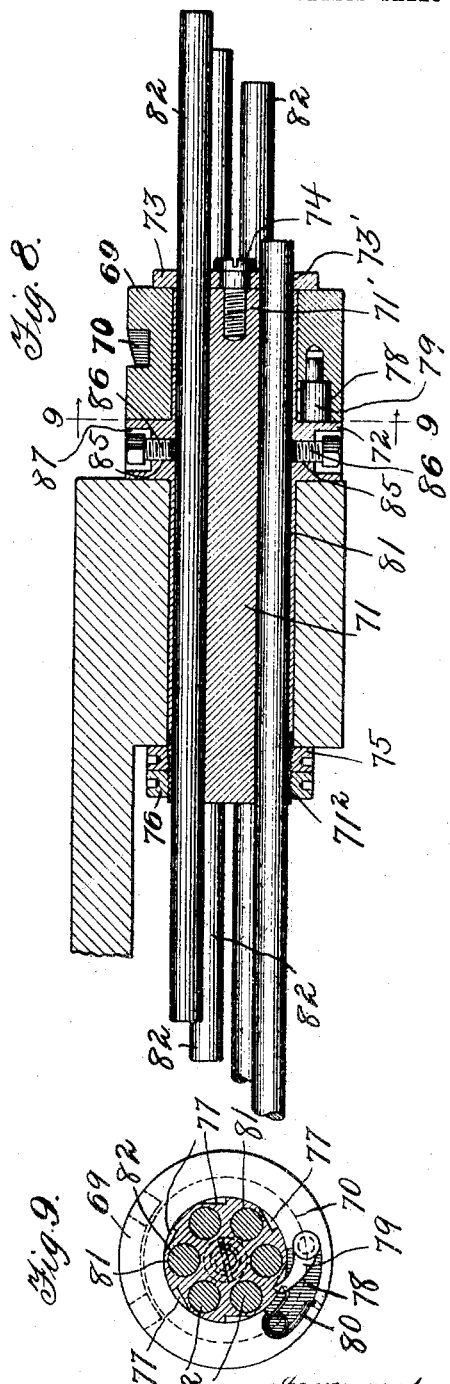
Witnesses:
F. G. Campbell.
Wm. P. Laraway.
Inventor:
M. C. Johnson.
By his Attorneys:
Blodgett & Peck No. 766,828. PATENTED AUG. 9, 1904.
M. C. JOHNSON.
METAL WORKING MACHINE.
APPLICATION FILED MAR. 7, 1903.
NO MODEL. 12 SHEETS—SHEET 7.
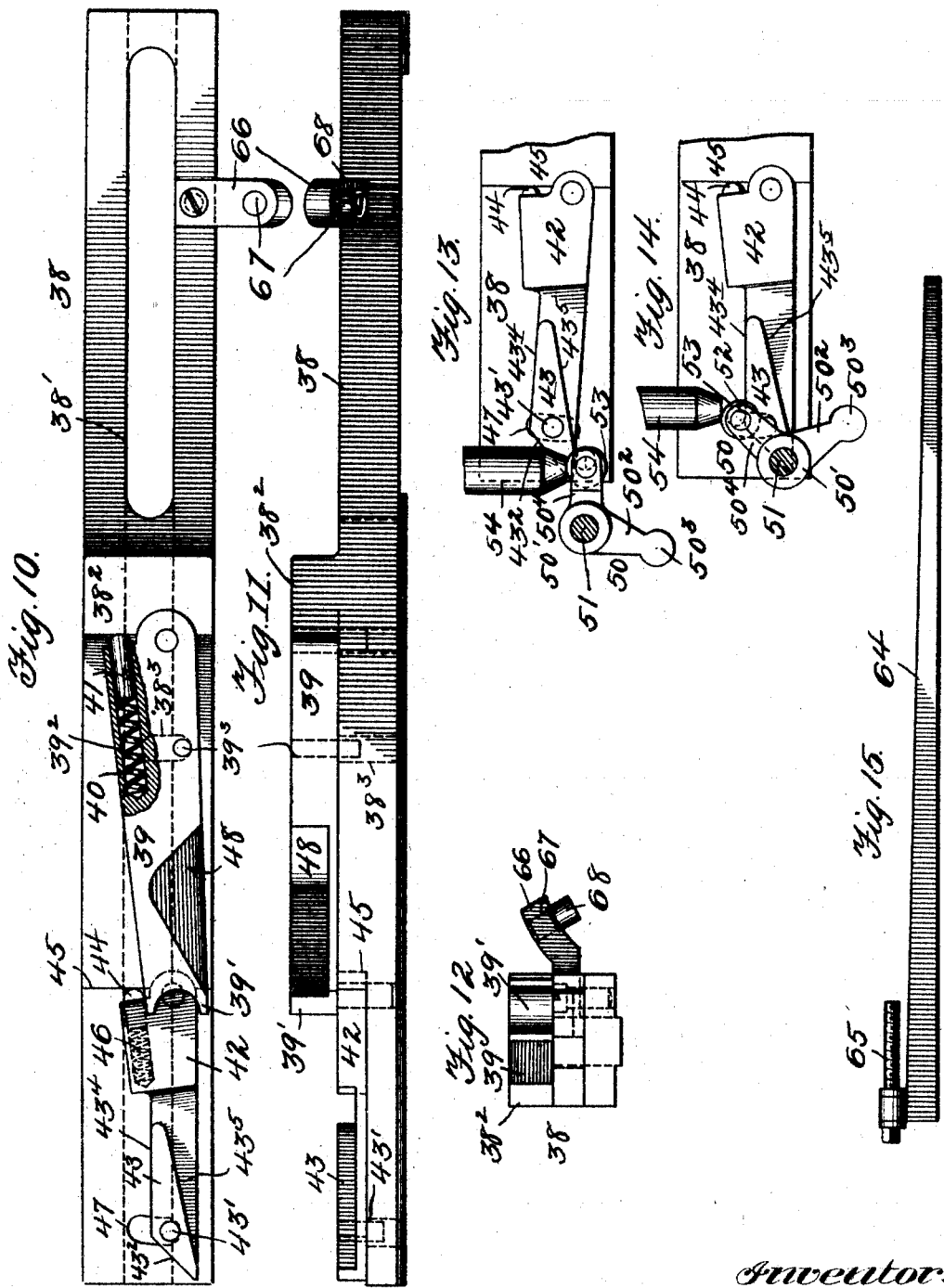
Witnesses:
Frank G. Campbell.
Wm. P. Laraway
Inventor:
M. C. Johnson.
by his Attorneys:

Witnesses:
Frank S. Campbell
Wm. P. Laraway

Inventor:
M. C. Johnson
By his Attorneys

No. 766,828. PATENTED AUG. 9, 1904.
M. C. JOHNSON.
METAL WORKING MACHINE.
APPLICATION FILED MAR. 7, 1903.
NO MODEL. 12 SHEETS—SHEET 9.

Witnesses:
F. G. Campbell.
Wm. P. Laraway.

Inventor:
M. C. Johnson.
By his Attorneys:

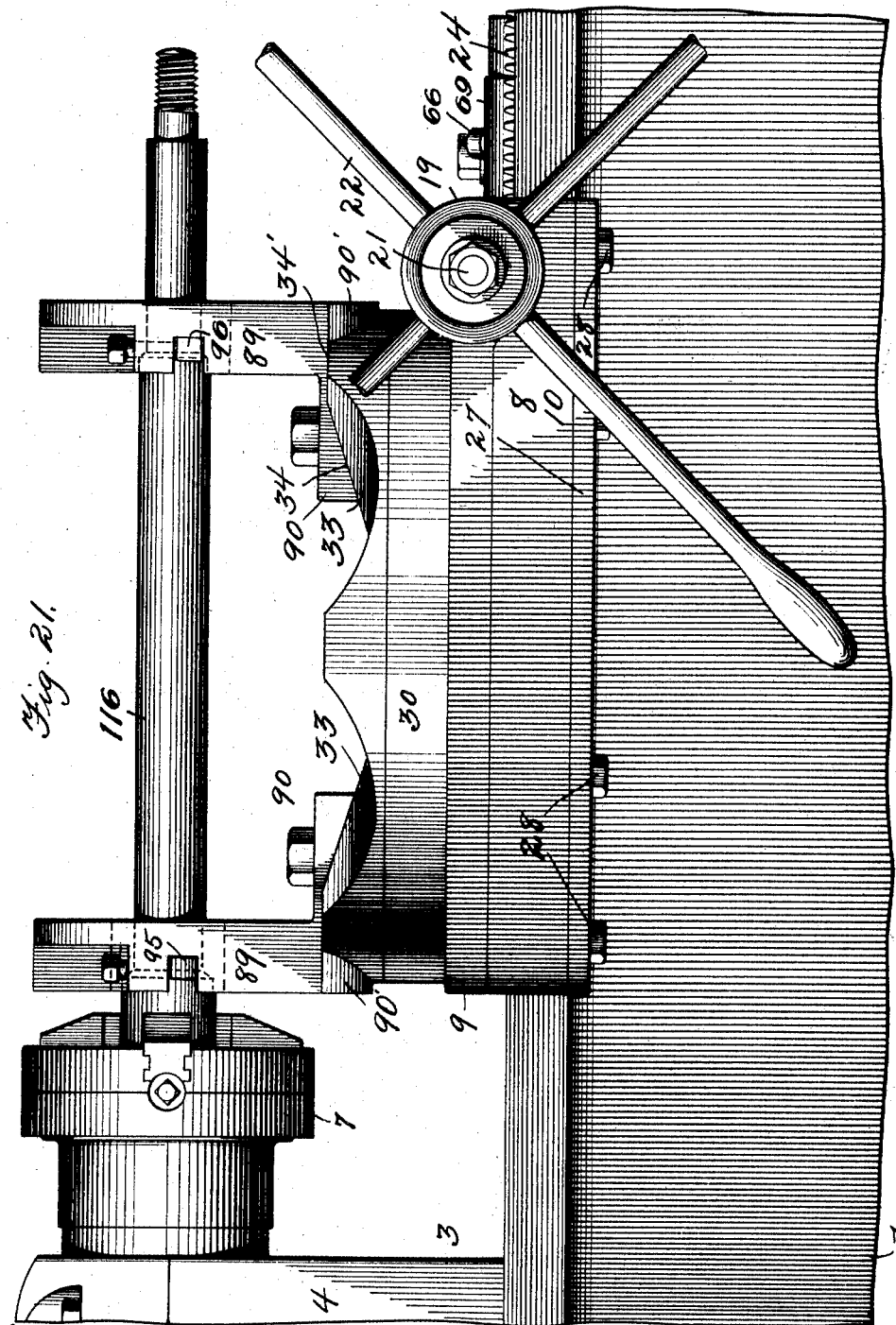

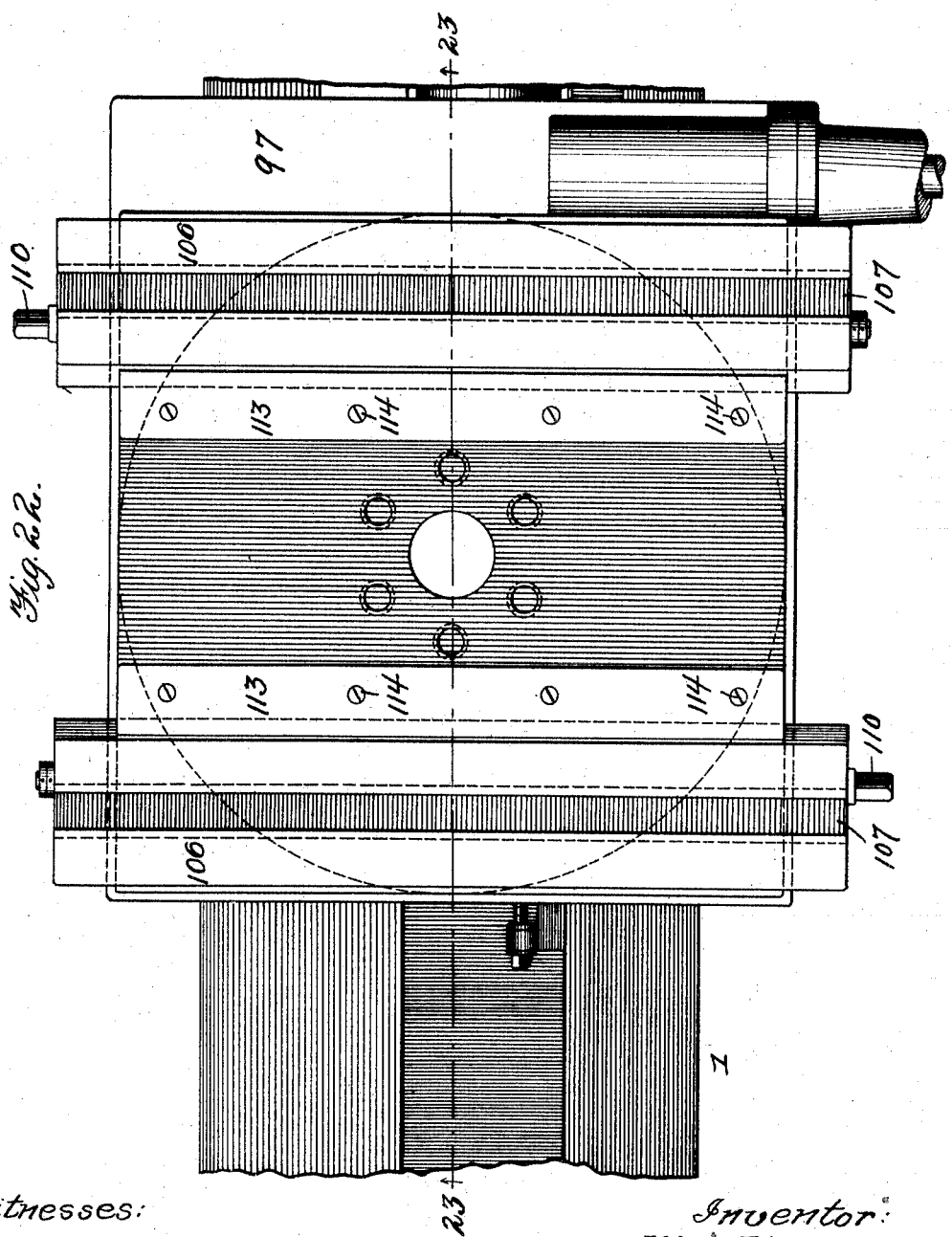

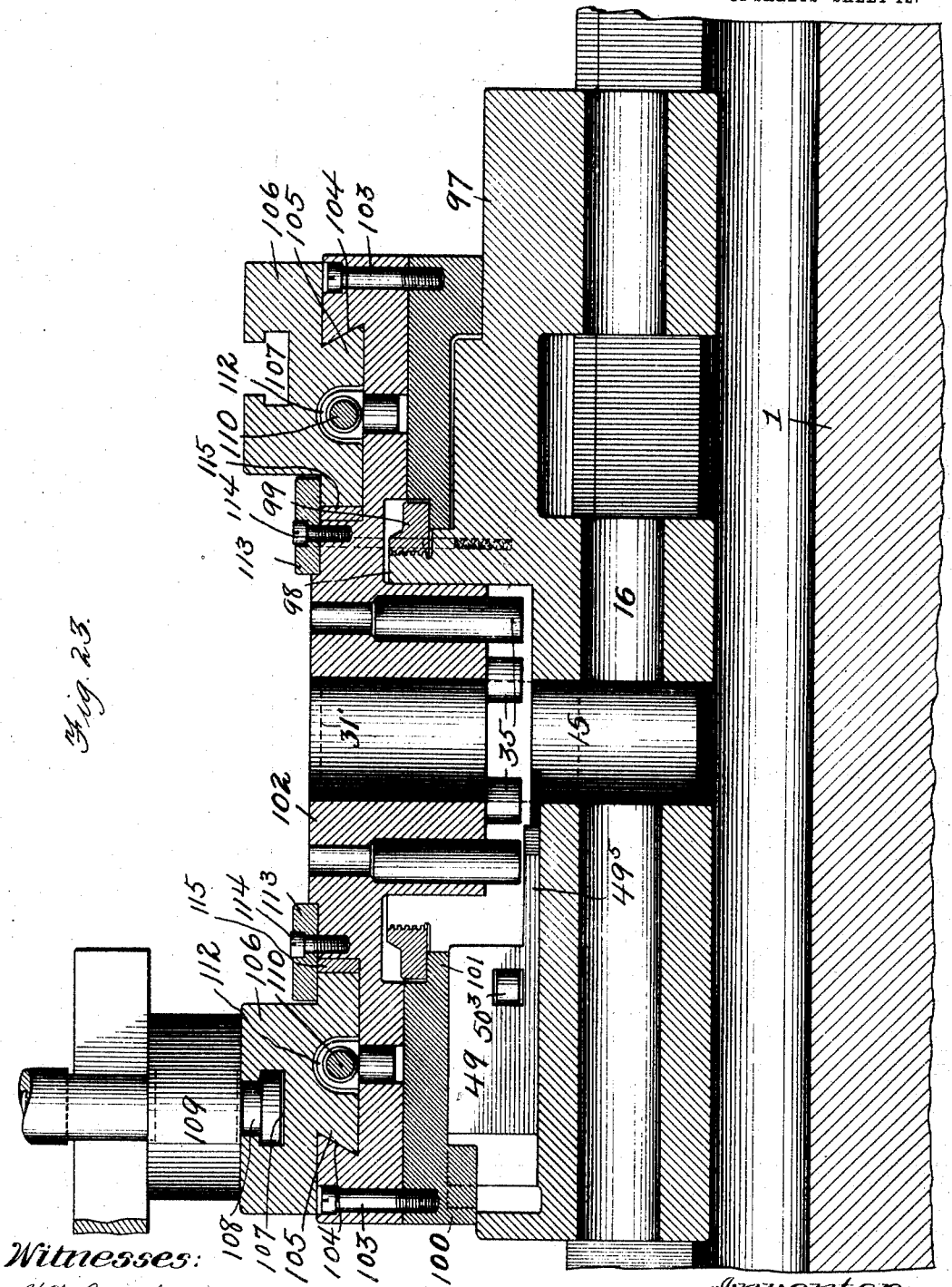

No. 766,828. Patented August 9, 1904.

UNITED STATES PATENT OFFICE.

MOSES C. JOHNSON, OF HARTFORD, CONNECTICUT.

METAL-WORKING MACHINE.

SPECIFICATION forming part of Letters Patent No. 766,828, dated August 9, 1904.

Application filed March 7, 1903. Serial No. 146,654. (No model.)

*To all whom it may concern:*

Be it known that I, MOSES C. JOHNSON, a citizen of the United States, residing at Hartford, in the county of Hartford and State of Connecticut, have invented certain new and useful Improvements in Metal-Working Machines, of which the following is a specification.

My invention relates to metal-working machines, and is shown applied to one of that class of such machines employed for performing a series of operations upon stock held in the chuck of a live spindle, although in many of the details it is not limited to the use specified.

Primarily my invention has for its object the provision of a table of peculiar construction for the reception of various blocks or supports carrying the tools for operating upon the stock.

A further object of the invention is the provision of improved means for indexing or intermittingly rotating the table and for locking and releasing the same.

A further object of the invention is the provision of improved means for securing the table against tipping movement or deflection from its true position on its carrier when strain is brought upon it by a tool in engagement with the work.

A further object of the invention is the provision of improved stop mechanism for limiting the movement of the carrier to which the intermittingly-rotating table is secured.

A further object of the invention is the provision, in connection with the table, of an index-ring kept in proper position by an externally-threaded circular projection of the carriage.

Other objects of the invention will be hereinafter mentioned.

Figure 16:
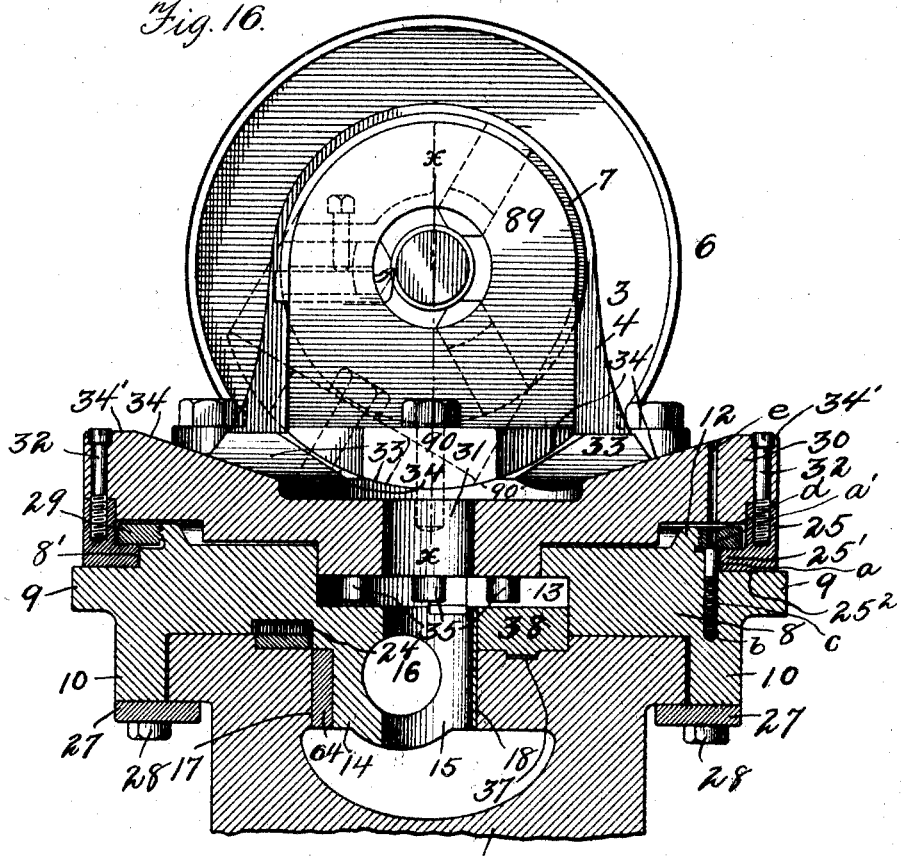
Figure 17:
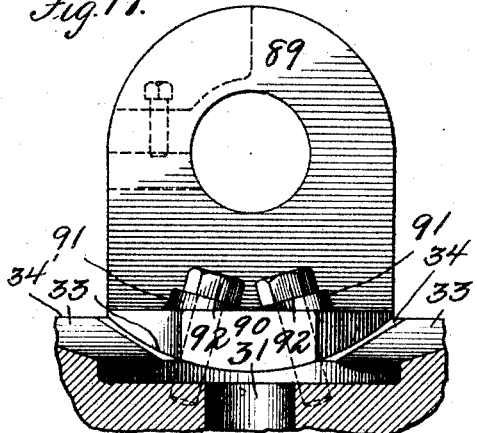
Figure 18:
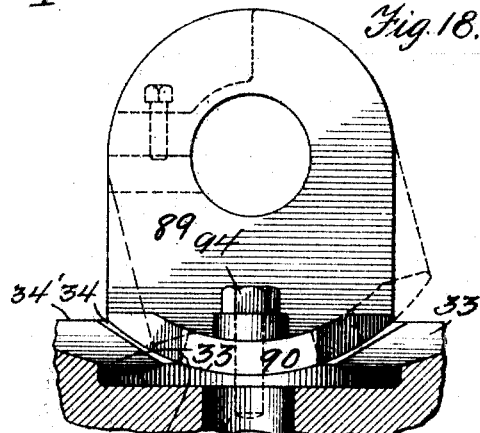
Figure 19:
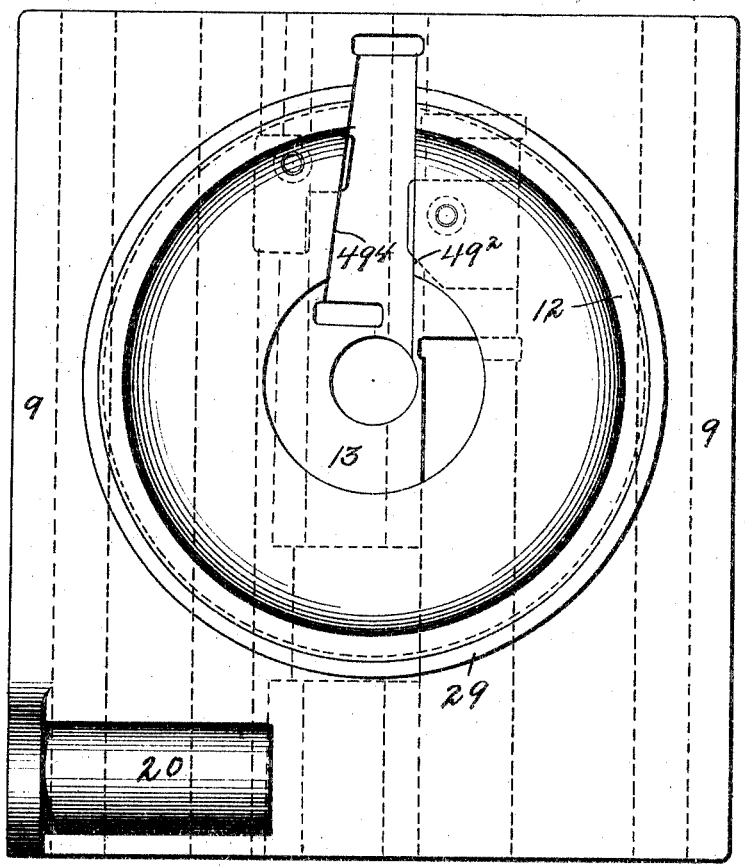

In the accompanying drawings, Figure 1 is a side elevation of a metal-working machine involving the features of my invention. Fig. 2 is a plan view with part of the bed and the head-stock removed. Fig. 3 is a transverse section on line 3 3 of Fig. 2. Fig. 4 is a horizontal section on the line 4 4 of Fig. 3. Fig. 5 is a detail in perspective of a lever for actuating the locking-bolt. Fig. 6 is a plan view of the carriage with the table removed, showing the top of the index-ring and also the top of the ring for securing said index-ring in position. Fig. 7 is a transverse section on line 7 7 of Fig. 2. Fig. 8 is a longitudinal vertical section of the stop-carrier, taken on line 8 8 of Fig. 7. Fig. 9 is a transverse section of said stop-carrier, taken on line 9 9 of Fig. 8. Fig. 10 is a plan view of the adjustable pawl-carrier, part of the pawl being shown in section to disclose the spring-actuated pin or plunger mounted in a bore thereof. Fig. 11 is a side elevation of said pawl-carrier, and Fig. 12 is a front end view thereof. Figs. 13 and 14 are plan views of the front end of the pawl-carrier, showing, respectively, different positions of the pivoted lever for actuating the locking-bolt and of the cam and spring-actuated plunger coöperating with said lever. Fig. 15 is a plan view of a taper gib employed with the carriage. Fig. 16 is a transverse section on line 16 16 of Fig. 1. Figs. 17 and 18 are sectional views of like portions of the intermittingly-rotating table, showing the concave or arc seats and different ways of securing the convex bases of the tool-supports in said seats. Fig. 19 is a plan view, and Fig. 20 an end view, of the carriage with the parts supported thereby removed. Fig. 21 is a side elevation similar to Fig. 1 and illustrating two tool-holders carrying tools for simultaneously operating upon different parts of the work. Fig. 22 is a plan view of a modified form of table. Fig. 23 is a section on line 23 23 of Fig. 22, showing the index-ring located in its preferred position; and Fig. 24 is a section through a portion of the table and carriage.

Like characters designate similar parts throughout the several views.

Referring to the drawings, the numeral 1 represents a bed of any suitable kind, shown mounted on legs 2, although it may be supported in any other way. Upon this bed is a head-stock 3, in bearings 4 of which is journaled a spindle 5, driven by a belt upon a stepped pulley 6 in the usual manner, said spindle carrying a chuck-head 7, in which stock of any desired kind may be secured.

Figure 20:
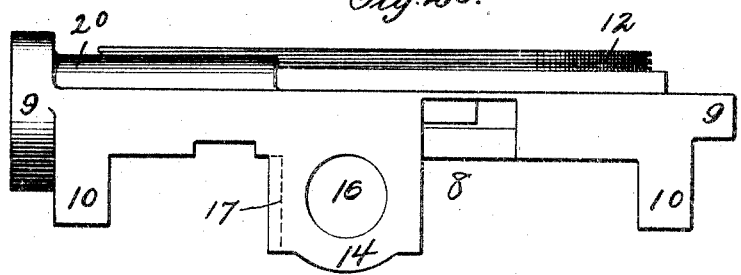

Designated in a general way by the numeral 8 is a carriage, shown as a slide, having lateral flanges 9, depending flanges 10, a circular externally-threaded ring 12, projecting from its top and either integral therewith or secured thereto, as desired, a central recess 13, and a rectangular tongue 14, extending longitudinally of said carriage and depending from its under surface, said tongue having a perforation 15, a longitudinal perforation 16, and a rabbet or recess 17 in its side, as shown in Figs. 16, 19, and 20, all for purposes hereinafter described. This tongue extends centrally of the carriage, and it is fitted in a rectangular slot 18, formed in the top of the bed 1 and extending from end to end thereof.

Within a bearing 19, inserted in a tubular boss 20 of the carriage 8, is mounted a shaft 21, having a hand-wheel 22 and carrying a pinion 23, the latter being in engagement with a rack 24 of the lathe-bed 1 and serving as a means for reciprocating said carriage upon the bed. This means for moving the carriage is one of many that could be employed for accomplishing the result, for the carriage may be reciprocated by hand or automatically by any desired mechanism without departure from the invention.

Carried by the cable 8 and constituting a part thereof is an index-ring 25, provided with an inwardly-projecting flange 25', said ring having a series of locking-notches 26 and a base 25², resting upon the top of carriage 8. In the forms shown the index-ring is of L-shape in cross-section, and the inner edge of its base fits against a circumferential shoulder or abutment 8' of the carriage 8, as shown in Figs. 3 and 16, and said ring may either be integral with or detachably connected to the table, as desired.

For securing the carriage upon the bed 1 the usual gibs 27 may be employed, said gibs fitting under the overhang of the bed and being attached to the flanges 10 by bolts 28; but other means may be utilized for this purpose, if desired.

Threaded upon the circular projection 12 of the carriage is an internally-threaded annulus 29, which bears upon the top of the projecting flange 25' of the index-ring and serves to keep said ring in position upon the carriage, the circular shoulder or abutment 8' forming a bearing around which said index-ring is fitted and is thus kept in its proper central location. For locking this annulus against movement after it has been adjusted a plunger $a$ and a spiral spring $b$ are seated in a recess $c$ of the carriage 8. This plunger has a rounded tip $a'$ and is adapted to snap into any one of a series of holes $d$ in the annulus, and thereby lock the same against displacement after it has been adjusted. Threads of any desired proportions may be formed on the inner circumference of the annulus and on the periphery of the circular projection 12, and, for instance, these threads may be of such pitch as to cause the annulus to move one-thousandth of an inch when it is turned in either direction a distance equal to the space between two of the holes. In the table 30 a vertical opening $e$ is formed, and for releasing the annulus so that it may be adjusted a rod $f$ is inserted in said hole $e$ and serves to push the plunger $a$ downward to the position represented by full lines in Fig. 24, after which by turning the table 30 the rod $f$ will adjust the annulus until the plunger snaps into the next hole of the series, and thus locks the annulus in its adjusted position. In this way a micrometric adjustment may be made, one that will cause the annulus to hold the ring 25 in place against vertical or tilting movement with sufficient clearance to enable said ring to be moved freely for indexing purposes. Other means may be provided for adjusting the annulus, the invention not being limited in this respect.

For reasons hereinafter stated the index-ring 25 and the circular projection 12 are so located that a line drawn vertically through their common axis will intersect the longitudinal axis of the live spindle 5. In other words, said ring and said projection are concentrically disposed, and therefore have a common axis, so that a line—for instance, the line $x$ $x$ in Fig. 16—drawn vertically through the center of the index-ring will pass through the longitudinal center of the live spindle and through the longitudinal axis of work supported by said spindle.

Any desired tool-carrying table may be mounted upon the index-ring, and several forms of such a table are herein shown and described. Coming now to the preferred form of said table, it is designated by 30 and consists of a circular plate or disk having a central perforation 31, which when the table is secured in position upon the index-ring 25 by screws 32 or otherwise is in line with the transverse opening 15 of the carriage 8. Here it may be stated that the table may also be fitted upon a cylindrical stud or plug 31', (see dotted lines, Fig. 23,) seated in the opening 15 of the carriage and projecting into the opening 31; but this opening is intended more particularly as a means for receiving an arbor for supporting the table when the tool-block seats or concave recesses are formed therein and below the top thereof, as will be hereinafter explained.

Radiating from the center of the table 30 are concave seats or recesses 33, each occupying an equal proportion of the surface of said table and each being located below the top thereof. Between every pair of seats the material of the table is left of full depth, thereby producing ribs or lands 34, the arcs of the seats merging in said lands and the latter being enlarged at their outer ends at 34' to form bearings for the screws 32, which secure the table to the index-ring, as shown in Figs. 1, 2, 3, and 16. Each arc-seat is of the same curvature, and the seats may be formed in a table by mounting said table upon the carriage in the manner above described, then attaching a suitable boring or other tool to the line spindle 5, and then rotating the spindle and simultaneously advancing the carriage 8 and the table longitudinally beneath the tool, and after one seat has thus been made the table could be indexed and another seat formed, and so on until the set of seats is completed, each seat of which set would be of the same arc shape and of the same radial length, and all would be formed on a curve concentric to the axis of the rotating lathe-spindle. This is but one of several ways in which the arc-seats could be formed, and it is immaterial how they are made, provided that each will bear the relation described to the axis of the lathe-spindle when the table is indexed to bring a pair of its seats into line therewith. Depending from the table are studs or pins 35, and secured by a bolt 36 in a groove 37 of the bed 1 is a bar 38, having a slot 38', through which the bolt passes, said bar being first adjusted to position and then firmly clamped in place by the bolt. This bar is shown detached in Figs. 10 and 11, and it is provided with an enlarged portion $38^2$, having a seat in which is pivoted a pawl or dog 39, having a fork 39' at its free end for engaging the studs or pins 35 as the carriage moves away from the spindle to thereby partially rotate the table to bring a tool carried by one of the blocks in the arcuate seats of said table into position for operation upon the stock. This pawl is recessed at $39^2$ to receive a spring 40 and a pin 41, bearing against the spring, which pin rests against the enlarged part or head $38^2$ of the slide and holds the pawl in a position to engage the pins 35 to rotate the table when it moves away from the spindle, as above stated. Secured to the pawl is a pin $39^3$, fitted in a slot $38^3$, the end walls of which limit the movement of said pin and pawl.

Pivoted in a seat of the bar 38 is an arm 42, carrying a cam 43, the pivoted end of this arm being recessed to receive a pin 44, normally forced outward to bear against an abutment 45 of the bar 38 by a spring 46, and the cam having a pin 43', which is movable in a short transverse slot 47 in the forward end of said bar, said pin 44 thus serving normally to throw the arm 42 and its cam 43 to the position shown in Fig. 10 for a purpose hereinafter described. To enable the arm of the pawl to clear the pin 35 just back of the one in engagement with the fork or notch 39' of said pawl, the latter is cut away or recessed at 48, as shown in Figs. 4, 10, and 11.

Mounted in a groove $49^2$ of the carriage 8 is a locking-bolt 49, having its end inclined at 49' to enable it more readily to enter the flaring locking-notches 26 of the index-ring 25. To advance and withdraw said locking-bolt, a bell-crank lever 50 is employed, said lever having a hub 50' mounted upon a stud 51 of the carriage 8. One arm, $50^2$, of this bell-crank is provided with an enlarged rounded head $50^3$, fitted in a perforation $49^3$ of the locking-bolt, while the other arm, $50^4$, carries a stud 52 and an antifriction-roller 53, located in a slot $50^5$ of said arm. Fitted in a transverse recess of the carriage 8 are a tubular plunger 54 and a spring 55, entering said plunger, and the tension of which may be regulated by a screw-cap 56, threaded into the walls of the recess, as shown in Fig. 4. Located in the groove $49^2$ of the carriage 8 parallel to the locking-bolt 49 is a gib 57, having a straight side fitting against said bolt and a tapering side in engagement with an inclined wall $49^4$ of the groove. This gib is reduced at its front end, which dips below the index-ring 25, and is adapted to engage an adjustable screw or stud 58, the latter serving to limit its inward movement, (see Fig. 4,) and it is held with the desired amount of friction against the side of the locking-bolt by a bell-crank lever 59, the hub of which is mounted on a stud 60, projecting from the carriage. One arm, 59', of the bell-crank is received in a seat of the gib, while the other arm, $59^2$, bears against a plunger 61, mounted in a perforation of the carriage 8, the stem of said plunger being surrounded by a spring 62, the tension of which may be regulated by a tubular screw 63. As will be seen, this gib is constantly impelled forward by the bell-crank 59, urged to its work by spring-actuated plunger 61, and it therefore bears with sufficient pressure against the locking-bolt to take up all lost motion or wear of said bolt, and thereby cause the same to work accurately and with precision, all danger of jamming the bolt being prevented by so adjusting the screw 58 that said gib cannot be advanced beyond the extent necessary to accomplish the result for which it is intended. It is necessary that the locking-bolt 49 should be fully withdrawn from the notch 26, in which it is located, before the table is indexed to bring another tool into position, and this result is accomplished by the bell-crank lever 50, connected to said bolt, and the cam 43, carried by the pivoted lever-arm 42. This indexing is accomplished on the movement of the carriage away from the spindle, and on the inception of this movement the pin 52 of the lever travels up the inclined face $43^2$ of the cam, which is in position to receive said pin, as shown in Figs. 10 and 14. As the pin 52 travels up the incline $43^2$ of the cam the lever 50 is rocked from the position represented in Fig. 13 to that shown in Fig. 14, and thus withdraws the locking-bolt from the notch 26 in the index-ring 25. Spring-actuated plunger 54 travels, as above stated, with the carriage and constantly bears against the roller 53 of the bell-crank lever, and consequently forces the pin 52 against the cam. This cam is provided with a straight surface 43⁴ and with an inclined side 43⁵, and after the lever has been rocked to withdraw the locking-bolt by the inclined nose 43² of the cam the pin 52 travels along the straight portion 43⁴ and locks the lever, and therefore the locking-bolt, in its withdrawn position until the table has been completely indexed by the pawl 39 in engagement with one of its pins 35. At the completion of the rearward movement of the carriage the pin 52 drops off the rear end of the cam, and the plunger 54, which was forced inward against the stress of its spring 55 when said pin was drawn up the incline 43², will immediately force the lever to the position represented in Fig. 4 and shoot the locking-bolt into the recess 26 of the index-ring, which is opposite thereto. To insure the proper location of the wedge-shaped end of the cam, so that the pin 52 will readily engage therewith, the horizontal lever-arm 42, which is pivoted on a vertical axis, is forced to the position represented in Fig. 10 by the spring-actuated plunger 44, which bears against the abutment 45 of the bar 38. In this way the locking-bolt is first withdrawn, then locked in its withdrawn position, and finally shot into place and locked against movement by the plunger 54 and bell-crank lever 50.

To take up wear and lost motion of the carriage 8 as it reciprocates on the bed, a taper gib or key 64 is fitted in the longitudinal recess 17 of said carriage and bears on one of its sides against the inner wall of the slot in the bed 1, in which the rectangular tongue 14 travels, and on its opposite side against the tongue, as shown in Figs. 3, 7, and 16, and for adjusting this gib a screw 65, threaded into the carriage and mounted in any desired way upon the gib, may be employed.

Projecting from bar 38 is an arm 66, carrying a stud 67, upon which is sleeved an anti-friction-roll 68.

Designated by 69 is a cylinder having a spiral cam-groove 70 for the reception of the roll 68, and this cylinder is loosely mounted upon the outer end 71' of a stop-carrying turret 71, located for intermittent rotation in that part of the central longitudinal bore 16 which extends through the outer end of the carriage 8, as shown more particularly in Figs. 3 and 8. This turret is provided with a circumferential collar 72, either formed integral therewith, as shown, or detachable therefrom, and the cam-cylinder 69 is held loosely against said collar by a plate 73, the latter being secured in position by a screw 74, threaded into the end of the turret. At its inner end the turret is threaded at 71² to receive a nut 75, which when turned against the wall of the turret-bearing in the carriage will force the collar tightly against the end of said carriage, as shown in Fig. 8, thereby securing it in position. A jam-nut 76 is also threaded upon the end of the turret and locks the nut 75 against rotation.

In the periphery of the part 71' of the stop-turret are ratchet-teeth 77, spaced at regular distances from each other, and mounted in a recess 78 of the cam-cylinder is a pivoted pawl 79, held in contact with the periphery of said cam-cylinder by a spring 80, as shown in Fig. 9. Longitudinally the turret is provided with a series of perforations 81 equal in number to the number of the ratchet-teeth 77, and in these perforations are adjustably fitted stop-rods 82, which pass through a series of holes 73' in the plate 73, said holes being in alinement with the perforations 81. In the periphery of collar 72 are notches 83, with which a spring stop-pawl 84 engages to lock the turret after each intermittent rotation thereof, said pawl being secured to the carriage, as shown in Fig. 7. In the periphery of this collar is also formed a series of threaded bores 85 for the reception of bolts 86, adapted to bear against the stop-rods and secure them in position after adjustment, the heads of said bolts being received in countersinks 87 of the collar, so that they will be below the surface thereof.

From the above description it will be seen that when the carriage moves away from the spindle roll 68 will turn the sleeve 69 and through the pawl-and-ratchet connections described index the stop-turret and that when it moves toward said spindle the sleeve 69 will rotate idly on the part 71' of said turret and the pawl 79 will slip around the ratcheted periphery of the part mentioned without actuating the turret. A stop 88 is shown in dotted lines in Fig. 1, and it serves to engage each stop-rod of the turret as said stop-rod is brought into position, and thus to limit the forward movement of the carriage. These stop-rods are located in the longitudinal bore 16 of the carriage, and they correspond in number to the number of arc-seats in the table. They are or may be so adjusted in the turret that their forward ends project different distances from the inner end of said turret and are therefore so disposed that the carriage will be stopped at the proper points in its advancing movements, so that the actions of the various tools upon the stock may be properly controlled.

In the arc-seats 33 of the table 30 tool-supports 89, shown as having lateral projections 90, with convex under surfaces 90', are mounted, and these supports may be secured in said arc-seats by various means. In Fig. 17 the lateral projection is provided with protuberances 91, having inclined tops against which the under surfaces of the heads of screw-bolts 92 bear, said bolts being tapped into the table, while in Fig. 18 the projection is slotted at 93 to receive a bolt 94, in virtue of which construction the tool-support may be adjusted in the arc of a circle concentric to the axis of the chuck-spindle 5. A great advantage of this form of tool-support resides in the fact that the convex projections come to an exact central position, the vertical axis of which is always in line with the longitudinal axis of the live spindle, whereby the tool is held in proper concentric relation to the work, no means of adjustment or special appliances being required for accomplishing this result. In other words, the tool-support when placed in its arc-shaped seat automatically centers itself with relation to the axis of said spindle and the work held in the chuck 7 thereof.

My invention is not restricted to any particular form of tool-support nor to any specific tool carried by said support, for different tool-supports with convex bases may be substituted for those shown without departure therefrom.

As will be seen from Fig. 21, when the table 30 is indexed to bring one tool-support into line with the axis of the spindle the one directly opposite thereto on the other side of said table is also brought into position, the result being that two different tools—for instance, the metal turning-tools 95 and 96—may be at work simultaneously upon the stock. Other kinds of tools may be employed for use upon the stock, those shown serving merely to illustrate one character of work that may be accomplished by the improved machine.

In the modification represented by Figs. 22 and 23 a carriage 97 of substantially the same form as that represented in Figs. 3 and 16 is shown, and said carriage is provided with central and longitudinal perforations 15 and 16, like those of the carriage 8. Rising centrally from the carriage 97 is an integral, or it may be detachable, externally-threaded circular projection 98, and fitted upon this projection is an internally-threaded annulus 99, similar to the annulus 29, but of slightly-different shape therefrom. An index-ring 100, provided with flange 101, is secured in place upon the carriage 97 by said annulus, and this ring is indexed and locked in position by means like those shown in Fig. 4, the locking-bolt being designated by the numeral 49 and the end $50^3$ of arm $50^2$ of the bell-crank lever 50 for actuating the bolt being shown. Here it may be stated that the locking-bolt is reduced to form a tail or extension $49^5$, so that it may be freely reciprocated beneath the lower ends of the pins 35. In said Figs. 22 and 23 a table 102 is shown secured to the index-ring 100 by screws 103, and this table is recessed or cut out below its top to form guideways 104 for the reception of tongues 105 of slides 106, having guide-grooves 107 of a shape to receive the T-heads 108 of tool-posts 109, said slides being actuated by means of screws 110, working in nuts 112, the stems of which are inserted in bores of the table. For securing these slides in place plates 113 are shown attached to the table by screws 114, said plates fitting over rabbets of the slides, and for taking up wear or lost motion shims or gibs 115 may be employed. Any desired kind of tools may be fitted on these slides, and while tool-posts for holding turning-tools are shown other tool-supports may be substituted, if desired.

As above stated, the arrangement of the annulus and threaded projection illustrated in Fig. 23 is preferred, said parts being removed from the periphery and located near the axis of the index-ring, and consequently that of the table. This forms a compact construction, enables an index ring or disk of greater rigidity to be employed, and is also less expensive to manufacture.

In the operation of my improved machine stock 116 is first secured in the chuck 7, the table is indexed by the mechanism described to bring the tool required into position for operation upon said stock, and the turret 71 is actuated to turn the one of its stop-rods required into line with the stop 88, after which the carriage 8 is advanced by the mechanism shown until the stop-rod 82, in position for action, comes into contact with the stop 88 and limits the further movement of the carriage. After one operation has thus been performed upon the stock the carriage is retracted, the table indexed to bring another tool into position, and said table then again locked in position, advanced to cause said second tool to act upon the work, and so on until the work is completed.

My improved table, with its arc-seats below the top thereof, may be manufactured and sold for use with various machines to the carriages of which it may be applied, and other forms of locking and indexing mechanisms may be employed in connection with said table without departure from the invention. Furthermore, the table may have one or any number of these arc-seats, the invention not being limited in this respect.

Changes in the location and arrangement of the various parts may be made, and the arc-seat table may be mounted on carriages different in form and different in mode of operation from the reciprocatory table shown. So, too, the threaded projection and internally-threaded annulus may be differently located, and various means may be substituted for that shown for both adjusting and locking said annulus.

Having thus described my invention, what I claim is—

1. A tool-holding table having a seat open at its top, and formed on an arc concentric to the axis of a work-spindle with which the table is to be employed.

2. A tool-holding table having a series of seats, each seat being open at its top formed on an arc concentric to the axis of a work-holding spindle with which said table is to be employed.

3. The combination, with a spindle, of a carriage; a table having a seat open at its top, and struck on an arc concentric with the axis of the spindle; and a tool supported in said arc-seat.

4. The combination, with a carriage, of a table having a series of arc-seats, each open at its top; tool-supports having convex bases fitted in said arc-seats; a carriage on which said table is mounted; means for reciprocating the carriage; and means for intermittingly rotating the table.

5. The combination, with a live-spindle, of a carriage; a table having arc-seats, each open at the top; tool-supports having convex bottoms secured in said arc-seats; means for reciprocating the carriage; an index-ring rigid with the table; means for intermittingly rotating the table; and means for engaging said index-ring to lock the same after the indexing operation.

6. The combination, with a carriage having a circumferential projection rigid therewith, of a tool-holding table; an index-ring rigid with the table; and an annulus in adjustable engagement with the circumferential projection of the carriage, and serving to hold said index-ring and table in place on said carriage.

7. The combination, with a carriage, having a circumferential, externally-threaded projection rigid therewith, of a tool-holding table; an index-ring rigid with said table; and an internally-threaded annulus in engagement with said projection and fitting over a part of the index-ring.

8. The combination, with a carriage, having a circumferential, externally-threaded projection, of a tool-supporting table; an index-ring detachably secured to said table, said ring having a circumferential flange; and an internally-threaded annulus in engagement with the threads of the projection and serving to secure the ring and table in place upon the carriage.

9. The combination, with a carriage having a circumferential projection, of a tool-supporting table; an index-ring rigid with said table; an annulus in adjustable engagement with the circumferential projection and fitting over a part of said index-ring; and means for locking the annulus.

10. The combination, with a carriage, having a rigid, circumferential, threaded projection, of a tool-holding table; a threaded annulus in engagement with the threaded projection, and fitting over a part of the table; and means on the carriage for locking the annulus.

11. The combination, with a carriage, of a revoluble table; a threaded, circumferential projection carried by the carriage, and located at or near the axis of said table; and a threaded annulus in engagement with the circumferential projection, and fitting over a part of the table.

12. The combination, with a carriage, of a revoluble table, an externally-threaded circumferential projection rising from the table near the axis thereof; and an internally-threaded annulus in engagement with said projection, and fitting over a part of the table.

13. The combination, with a carriage, of a revoluble tool-supporting table mounted on said carriage; an index-ring rigid with the table, and having a flange; a threaded, circumferential projection rising from the table; and a threaded annulus in engagement with said projection, and fitting over the flange of said index-ring.

14. In a machine of the class specified, the combination, with a carriage, of a revoluble tool-supporting table mounted on said carriage; an index-ring having a lateral extension rigid with the table; a threaded, circumferential projection rising from the carriage; a threaded annulus in engagement with said threaded projection and fitting over the lateral extension of the index-ring; and means for locking said annulus against rotation after it has been adjusted.

15. The combination, with a carriage, having a circumferential, threaded projection, of a revoluble tool-supporting table; a ring rigid with the table; a threaded annulus in engagement with the projection and fitting over a part of the ring; and means for locking the annulus against displacement.

16. The combination, with a carriage having a threaded, annular projection, of a revoluble tool-holding table mounted on said carriage; a threaded annulus in engagement with the annular projection, and fitting over a part of the table; and a device on the carriage for locking said annulus.

17. The combination, with a carriage, of a revoluble tool-holding table mounted on said carriage; a threaded, circumferential projection on the carriage; a threaded annulus in engagement with said projection, said annulus having a series of perforations; and a spring-actuated plunger carried by the carriage and adapted to enter said perforations and lock the annulus against movement after it has been adjusted.

18. The combination, with a carriage having a recess, of a revoluble table mounted on said carriage, and having a passage adapted to receive a tool; a circumferential projection on the carriage; an annulus in adjustable engagement with the projection, said annulus having perforations; and a spring-actuated plunger seated in the recess of the carriage, and adapted to enter said perforations in the annulus, and to be released therefrom by a tool inserted in said passage of the table.

19. In a machine of the class described, the combination, with a carriage having a circumferential threaded projection, and also having a recess, of a threaded annulus having perforations, and in engagement with said projection; a spring-actuated plunger seated in the recess of the carriage, and adapted to enter the perforations of the annulus; and a revoluble table held in place on the carriage and having a perforation for the reception of a tool for depressing the plunger, whereby said plunger will be released, and the annulus may be adjusted by turning the table.

20. In a machine of the class described, the combination with a live-spindle and its chuck, of a revoluble table mounted on an axis intersecting the axis of the spindle, and having an open-top arc-seat for the reception of a tool-support, said arc-seat being formed on a curve concentric to the axis of the spindle.

21. In a machine of the class described, the combination, with a live-spindle, of a revoluble table having an open-top tool-carrying arc-seat radiating from its axis, said arc-seat being formed on a curve concentric with the axis of the spindle; a tool-support having a curved base formed on an arc of the same radius as that of said arc-seat; and a carriage on which said table is mounted.

22. In a machine of the class described, the combination, with a carriage, of a live-spindle; a revoluble table having a series of open-top tool-carrying arc-seats radiating from its axis, each arc-seat being formed on a curve concentric with the axis of the spindle; a series of tools mounted in said arc-seats; means for indexing the table; and means for locking said table subsequent to the indexing operation.

23. In a machine of the class described, the combination, with a carriage, of a table mounted thereon; a series of pins projecting from said table; a stationary bar carried by the frame; means whereby said bar may be adjusted and then secured in position, a dog pivoted to said bar, and adapted to engage the pins; a locking-bolt adapted to engage a part of the table; and means for advancing and withdrawing said locking-bolt.

24. The combination, with a carriage, of a table supported for intermittent rotary movement thereon and having locking-notches; a pivoted pawl; devices on the table with which said pawl is adapted to engage when the carriage is retracted; a cam having limited movement; a locking-bolt; and means actuated by the cam for retracting said locking-bolt.

25. The combination, with a machine-frame, of a bar adjustable on said frame; means for rigidly securing said bar after adjustment; a pawl pivoted to the bar; a reciprocatory carriage; a revoluble table mounted on the carriage; devices on the table and with which the pawl is adapted to engage upon the retraction of the carriage; an arm pivoted to the bar; a cam mounted on the arm; a locking-bolt; a two-armed lever, one arm of which is in engagement with said locking-bolt and the other of which is adapted to ride upon the cam and to throw the bolt in one direction; and means for actuating said lever to throw the bolt in an opposite direction.

26. The combination, with a carriage, of a table having locking-notches; means for intermittingly rotating said table; a locking-bolt; means for actuating said locking-bolt; a taper gib in engagement with the locking-bolt; a two-armed lever, an arm of which is connected to the locking-bolt; and a spring acting upon the other arm of said lever.

27. The combination, with a carriage having a groove, of a table; means for intermittingly rotating said table; a locking-bolt seated in the groove; means for advancing and withdrawing said locking-bolt; a taper gib also seated in the groove of the table; a bell-crank, one arm of which is connected to the gib; a spring-actuated plunger bearing against the other arm of said bell-crank; and an adjustable stop for limiting the movement of the gib.

28. The combination, with a carriage, of a revoluble table mounted on said carriage; a stationary bar fitted in a groove of the carriage; an indexing-pawl pivoted to said bar; devices on the carriage, and coöperating with said pawl in the indexing operation; an arm pivoted to said stationary bar; a cam having inclined and straight surfaces carried by said pivoted bar; a pivoted two-armed lever, one arm of which carries a stud adapted to engage the cam; a locking-bolt connected to the other arm of said lever; an index-ring rigid with the revoluble table, and having notches for the reception of the locking-bolt; and a spring-actuated plunger bearing against the arm of the lever in engagement with the cam, said plunger serving to actuate the lever and to cause it to shoot the locking-bolt.

29. The combination, with a carriage, of a revoluble table mounted on said carriage; an adjustable bar secured to the bed and fitted in a groove of the carriage; means for indexing the carriage; a yielding arm pivoted to the bar; a cam having inclined and straight portions carried by the bar; a two-armed lever pivoted to the carriage; a stud on one arm of said lever, said stud being adapted to engage the cam; a spring-actuated device on the carriage, and in contact with the arm carrying the stud; a locking-bolt fitted in a groove of the carriage and connected to the other arm of said lever; and an index-ring rigid with the table, and having notches to receive said bolt.

30. The combination, with a bed, of a carriage; a tool-supporting table mounted on said carriage; a bar secured to the bed and over which the carriage travels; means for indexing the table; an arm pivoted to the bar, and having a pin movable in a slot of said bar; a spring-actuated pin seated in a recess of the arm and bearing against an abutment of the bar; a cam having an inclined and a straight portion carried by the arm; a bell-crank pivoted to the carriage, one arm of said bell-crank carrying a pin adapted to engage the cam; a locking-bolt actuated by the other arm of the bell-crank; a spring-controlled device for causing said bell-crank to shoot the bolt; and an index-ring rigid with the revoluble table and having notches for the reception of said locking-bolt.

31. The combination, with a carriage, of a stop-carrying turret having a series of perforations; stop-rods adjustable in said perforations; a device sleeved upon the turret; means for oscillating said device; and means for connecting said device with, and disconnecting it from, the turret.

32. The combination, with a carriage, of a stop-carrying turret journaled for intermittent rotation therein; stop-rods adjustably connected to said turret; means for clamping said rods after adjustment; a cylinder sleeved on the turret; a pawl carried by said cylinder, and adapted to engage teeth on the turret; and means for turning said cylinder.

33. The combination, with a carriage, of a stop-carrying turret mounted thereon, and having longitudinal perforations; stops adjustable in said perforations; means for clamping said stops after adjustment; a sleeve having a cam-groove, said sleeve being loosely mounted on the turret; a pawl carried by the sleeve, and adapted to engage teeth on said turret to index the same; and a stationary stud fitted in the cam-groove.

34. The combination, with a carriage, of a stop-carrying turret mounted thereon, and consisting of a cylinder having longitudinal perforations, said cylinder being provided with a collar intermediate its ends and with ratchet-teeth; a cam-sleeve loose on one end of the cylinder; a pawl carried by the sleeve and adapted to engage the ratchet-teeth, when the sleeve is moved in one direction; stop-rods adjustable in the perforations of the cylinder; screws threaded into the collar, and adapted to clamp the stop-rods in place after adjustment; a stud projecting from the frame, and serving to actuate the cam; means for reciprocating the carriage; and a stop carried by the frame, and serving to engage the stop-rods and limit the movement of the carriage.

35. The combination, with a reciprocatory carriage, of a stop-carrying-turret cylinder having a series of longitudinal perforations; a table mounted on the carriage; means for indexing the table; adjustable stop-rods mounted in the perforations; means for securing said rods in place after adjustment; a sleeve having a cam-groove, said sleeve being loose on the cylinder; means for connecting said sleeve with the turret-cylinder when the sleeve is actuated in one direction; and a stationary stud entering the cam-groove and serving to actuate the sleeve.

36. The combination, with a reciprocatory carriage, of a tool-supporting table mounted on said carriage; a bar adjustable in the frame; a pawl pivoted to said bar; a series of pins depending from the turret, and with which the pawl is adapted to engage; a bracket carrying a stud, said bracket being secured to the bar; a longitudinally-perforated stop-carrying turret mounted in the carriage; stop-rods adjustable in the perforations of said turret; means for securing said stop-rods after adjustment; a sleeve having a cam-groove, for the reception of the stud, said sleeve being loose on the turret; and a pawl carried by the sleeve, and adapted to engage teeth on the turret.

37. The combination, with a carriage, having an annular, threaded projection rising from its central portion, of a tool-supporting table having a flange; a threaded annulus engaging the projection and fitting over the flange; and a removable device actuated by the table for rotating said annulus.

38. The combination, with a movable carriage having a bore, of a support; a stop-rod carried by the support and located in the bore; and a stop on the frame extending into the bore of said carriage, and adapted to engage the stop-rod.

39. The combination, with a movable carriage having a bore extending through it, of a revoluble turret; stop-rods carried by the turret and extending into the bore; and a stop carried by the frame and adapted to engage the stop-rods and thus limit the movement of the carriage.

40. The combination, with a reciprocatory carriage having a longitudinal bore, of a turret seated in a part of said bore, said turret having longitudinal perforations; stop-rods adjustable in said perforations; means for securing said stop-rods after adjustment; means for intermittingly rotating the turret; and means for engaging the stop-rods and thus limiting the movement of the carriage.

41. In a machine of the class described, the combination, with a carriage, said carriage having a central recess, and adjacent to said recess an externally-threaded, circumferential projection, of a revoluble, tool-supporting table having a depending cylindrical portion seated in said recess; a ring rigid with the table; and an internally-threaded annulus in engagement with said threaded projection, and fitting over a part of said ring.

42. In a machine of the class described, the combination, with a carriage having a central depression and bordering said depression an externally-threaded projection, of a tool-carrying table having a cylindrical portion fitted in the depression; a ring secured to the table and having an inner flange; and an internally-threaded annulus in engagement with the projection, and fitting over the flange.

43. The combination, with a carriage, having a central recess, and bordering said recess a circumferential, externally-threaded projection, of a tool-supporting table provided with a cylinder fitted in said recess; a ring attachably secured to the table, and having a flange fitting against a circumferential shoulder of the carriage; and an internally-threaded annulus in engagement with the projection, and fitting over the flange.

44. The combination, with a reciprocatory support, of a tool-carrying table mounted for intermittent rotation thereon; means for indexing said table; a bolt for locking the table; a bell-crank, one arm of which is connected to the bolt; a stud or roller carried by the other arm of the bell-crank; a bar pivoted to a stationary support; a spring-actuated plunger for tilting the arm; a cam having inclined and straight surfaces with which the stud of the lever is adapted to engage; and a spring-actuated plunger in constant engagement with the roller on said stud.

45. In a machine of the class described, the combination, with a reciprocatory carriage having a central perforation and a longitudinal perforation, of a tool-carrying table also having a central perforation in line with the central perforation of the carriage; means for indexing said table; means for locking and releasing the table; a turret; stop-rods carried by the turret and entering the longitudinal perforation of the carriage; a stop with which said stop-rods are adapted to engage; and means for indexing the turret.

46. In a machine of the class described, the combination, with a reciprocatory carriage having a central, transverse perforation and a central, longitudinal perforation, of a tool-carrying table also having a central transverse perforation; means for indexing said table; means for locking said table subsequent to the indexing operation; means for releasing the table prior to said indexing operation; a stop-turret mounted in the central, longitudinal perforation of the table; a series of adjustable stop-rods carried by said turret and entering said longitudinal perforation; means for indexing the turret; and a stop projecting from the frame and also entering said longitudinal perforation.

47. In a machine of the class described, the combination, with a carriage having a longitudinal perforation, of a stop projecting from the frame and entering one end of said perforation; a stop-turret mounted for rotation in the opposite end of said longitudinal perforation; a series of adjustable stop-rods projecting from the turret and adapted successively to engage the frame-stop; pawl-and-ratchet mechanism for indexing the turret; and means for actuating said mechanism.

48. In a machine of the class described, the combination, with a reciprocatory carriage, of a tool-carrying table mounted for intermittent rotation on said carriage; means for indexing said table, said means comprising a pawl pivoted to a stationary support and pins depending from the table and with which said pawl is adapted to engage on the rearward movement of the table; a locking-bolt adapted to engage seats in a part of the table; means for shooting said bolt; means for withdrawing the bolt; a stop-turret having ratchet-teeth; adjustable stops carried by said turret; a cylinder having a cam-groove loose on the turret; a pawl carried by said cylinder and adapted to engage the ratchet-teeth; and a stationary stud having a roller engaging the cam-groove.

49. In a machine of the class described, the combination, with a machine-bed having a longitudinal groove, of a slotted bar having a tongue seated in said groove; a device passing through the slot of the bar, and serving adjustably to secure said bar to the bed; a carriage mounted for reciprocatory movement on the bed; a turret journaled in said carriage; a sleeve loose on the turret, and having a cam-groove; an arm projecting from the bar, and having a stud fitted in the cam-groove of the sleeve; means carried by the sleeve for actuating the turret when the sleeve is rotated; and a series of adjustable stops carried by the turret.

In testimony whereof I affix my signature in presence of two witnesses.

MOSES C. JOHNSON.

Witnesses:
FLORENCE H. JOHNSON,
WM. P. LARAWAY.